Dec. 27, 1927.
J. A. SMITMANS
1,653,740
FLEXIBLE COUPLING
Filed Feb. 14, 1924
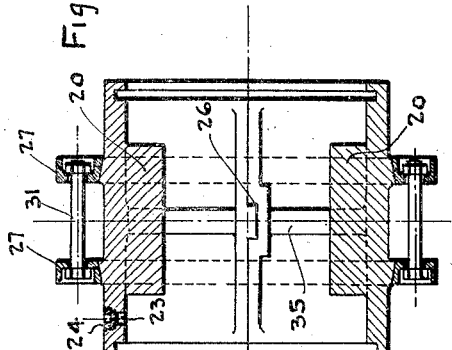
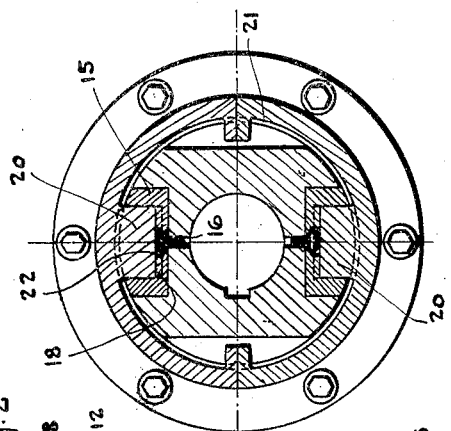
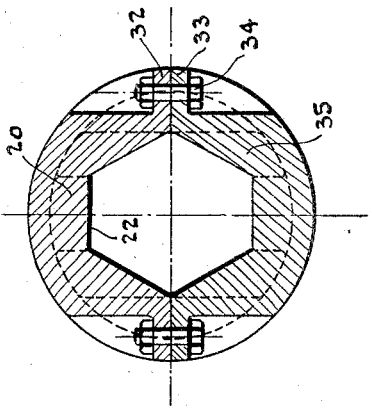
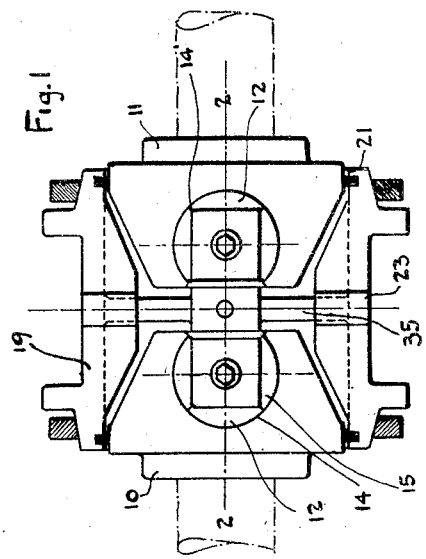
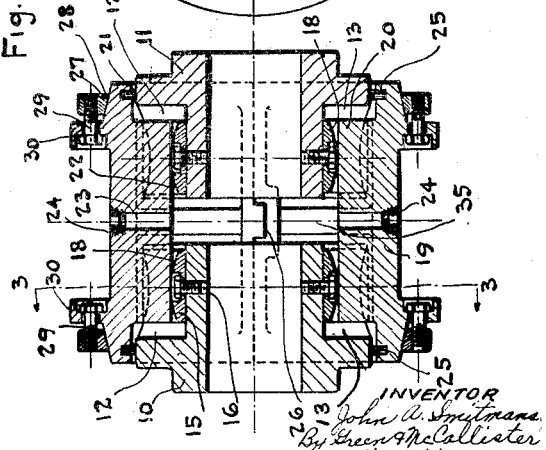
INVENTOR
John A. Smitmans
By Green & McCallister
His Attorneys Patented Dec. 27, 1927.

1,653,740

UNITED STATES PATENT OFFICE.

JOHN A. SMITMANS, OF PITTSBURGH, PENNSYLVANIA.

FLEXIBLE COUPLING.

Application filed February 14, 1924. Serial No. 692,688.

This invention relates to couplings and more particularly to flexible couplings for transmitting a great amount of power.

An object of the invention is to produce a flexible coupling for transmitting a great amount of power, which will compensate for any misalignment between the shafts to be coupled, which is simple and cheap to manufacture and which overcomes difficulties usually encountered in such devices.

A further object is to produce a coupling in which means are employed for eliminating to a large extent the friction between the moving parts of the coupling and in which simple and improved means are employed for supplying lubrication to the moving parts.

A still further object is to produce an effective coupling for transmitting a great amount of power in which the elements are so associated and arranged as to enable a shorter or more compact coupling to be effectively employed than has heretofore been deemed possible.

These and other objects, which will appear obvious to those skilled in this particular art, I attain by means of my invention, one embodiment of which is shown by way of illustration in the accompanying drawings, in which Figure 1 is a top plan view of a flexible coupling made in accordance with this invention; Fig. 2 is a longitudinal sectional view on the line 2—2 of Fig. 1; Fig. 3 is a cross section on the line 3—3 of Fig. 2; Fig. 4 is a cross section of a modified form of housing member and Fig. 5 is a longitudinal section through still another form of housing member.

The illustrated embodiment of my invention includes two substantially aligned coupling members, each of which is provided with oppositely disposed peripheral recesses. A U-shaped bearing shoe is swiveled in each of these peripheral recesses. A third coupling member, shown in the form of a cylindrical housing is provided with internal legs which engage the bearing shoes in the recesses in such a manner as to prevent relative rotation between the aligned coupling members but permit relative angular movement therebetween. (The bearing shoes being rotatable in the peripheral recesses permit the coupling members to oscillate about the swivel.)

The two axially aligned coupling members 10 and 11 are each provided with oppositely disposed peripheral recesses 12 and 13, the walls 14 of which are cylindrical except for the fact that they are cut away at 14' for a purpose to be described. A U-shaped bearing shoe 15 is rotatably secured within each recess and screw 16 or similar device may be used to prevent the shoes from falling out of the recesses during assembling of the coupling. The outer side faces 15 of each bearing shoe are curved similarly to the inner cylindrical wall 14 of the recess and are so dimensioned as to form a snug sliding fit therewith, as shown in Fig. 1. The inner bearing face 18 of each U-shaped shoe is in the form of a convex curve, as shown in Fig. 2.

The two coupling members 10 and 11 are similar in all respects and a single description is sufficient for both members.

Relative rotation between the two coupling members is prevented by such a device as that illustrated, which includes a cylindrical housing 19 provided with opposed projections 20 extending inwardly so as to engage the U-shaped shoes and bear on the convex bearing faces 18 thereof. The bore 21 of the cylindrical housing member is sufficient to allow each coupling member 10 and 11 to oscillate therein to take care of any misalignment of the shafts connected thereto.

When there is a misalignment of the connected shafts, the rotation of the shafts will occasion an oscillatory movement of at least one of the coupling members 10 or 11 with relation to the housing 19, and this movement will take place in two planes i. e. about the axis of the cylindrical recesses 12 and 13, and at right angles to that axis. Relative motion between the housing 19 and the coupling member, about the axis of the recesses will cause the shoes 15, which straddle the lugs 20, to oscillate within the cylindrical walls of the cooperating recesses about the axis of the recess; whereas relative motion at right angles thereto will occasion a sliding movement between the lateral faces of the lugs 20 and the inner engaging faces of the shoes and will also cause a rocking movement across the convex face 18 of each shoe. It will be apparent that relative motion intermediate the defined planes would occasion a combination of the rotary sliding and rocking motion above described. The walls 14 are cut away at their edges 14' adjacent the lugs 20 so as to permit the relative motion between the housing 19 and the coupling member about the axis of the recesses.

Lubrication is supplied to the coupling through channels 23 extending to the interior thereof. The outer ends of these lubricating channels may be closed by screw plugs 24. A flexible washer 25, made from hard felt, for example, is provided between each coupling member and the housing member so as to make an oil tight joint.

For ease in assembling, the housing 19 is split on an axial plane intermediate the lugs. The mating surfaces may have a tongue and groove connection 26 to prevent relative longitudinal movement. The separable parts are clamped together by clamping rings 27 having inner cam faces 28 adapted to cooperate with similar surfaces upon the exterior of the housing member. The clamping rings are secured in place through the medium of bolts 29 which extend through lugs 30 on the housing member and are threaded into the rings, see Fig. 2.

The formation of lugs upon the housing member may be dispensed with by clamping the two rings 27 directly to each other by means of bolts 31 as shown in Fig. 5.

If desired, the contacting edges of the separate portions of the housing member may be provided with cooperating flanges 32 and 33 which may be directly secured together by means of bolts 34 extending therethrough, as shown in Fig. 4.

Preferably a strengthening web 35 is formed on the interior of the housing member.

The ends of the two shafts which are to be coupled together are inserted one in each coupling member to which it may be keyed or secured in any other desired manner. Rotation of one shaft transmits rotation to the other through the medium of the U-shaped bearing shoes and the locking projection 20 which extends into adjacent shoes and prevents relative rotation between the two coupling members. Flexibility of the coupling results from the ability of each coupling member to oscillate about the axes of the cylindrical recesses and also about the contacting surface 18 of each bearing shoe, as above described. The coupling is lubricated through the channel 23 and the elastic washers 25 prevent any escape or leakage of the lubricant.

While I have described one form of my invention I do not wish to be limited thereto but what I claim and desire to secure by Letters Patent, is:—

1. In combination in a flexible coupling, two coupling members, each provided with oppositely disposed peripheral recesses, a rotatable bearing shoe in each recess and a housing provided with projections adapted to engage in said shoes so as to maintain said coupling members in non-rotatable, angularly movable relation.

2. In combination in a flexible coupling, two coupling members, each provided with oppositely disposed peripheral recesses, a rotatable U-shaped bearing shoe in each recess and provided with a convex bearing face, a housing member provided with projections adapted to engage the convex bearing face of said shoes so as to maintain said coupling members in non-rotatable, angularly movable relation.

3. In combination in a flexible coupling, two coupling members, each provided with oppositely disposed peripheral recesses, a split cylindrical member surrounding said coupling members and adapted to engage in said recesses so as to maintain said coupling members in non-rotatable angularly movable relation, cam faces on said cylindrical member and means cooperating with said cam faces to prevent relative movement between the parts of said cylindrical member.

4. In combination in a flexible coupling, two coupling members, each provided with oppositely disposed peripheral recesses, a split cylindrical member surrounding said coupling members and adapted to engage in said recesses so as to maintain said coupling members in non-rotatable angularly movable relation, cam faces on said cylindrical member, locking rings adapted to cooperate with said cam faces to prevent relative movement between the parts of said cylindrical member and means for securing said rings on said cam faces.

In testimony whereof, I have hereunto subscribed my name this 9th day of February, 1924.

JOHN A. SMITMANS.